United States Patent
Masters

[11] Patent Number: 5,982,105
[45] Date of Patent: Nov. 9, 1999

[54] TRANSFORMERLESS ELECTROLUMINESCENT LAMP DRIVER TOPOLOGY

[75] Inventor: John C. Masters, Tully, N.Y.

[73] Assignee: Applied Concepts, Inc., Tully, N.Y.

[21] Appl. No.: 08/967,652

[22] Filed: Nov. 10, 1997

[51] Int. Cl.$^6$ .................................................. G09G 3/10
[52] U.S. Cl. ...................................... 315/169.3; 315/362
[58] Field of Search .............................. 315/169.3, 362, 315/291, 383

[56] References Cited

U.S. PATENT DOCUMENTS

| | | | |
|---|---|---|---|
| 4,529,322 | 7/1985 | Ueda | 368/255 |
| 4,845,489 | 7/1989 | Hormel | 340/811 |
| 5,172,032 | 12/1992 | Alessio | 315/169.3 |
| 5,347,198 | 9/1994 | Kimball | 315/167 |
| 5,483,503 | 1/1996 | Kimball | 368/67 |
| 5,493,183 | 2/1996 | Kimball | 315/308 |
| 5,502,357 | 3/1996 | Kimball | 315/209 R |
| 5,515,258 | 5/1996 | Viertler | 363/26 |
| 5,581,160 | 12/1996 | Fujita | 315/169.3 |

*Primary Examiner*—Hoanganh Le
*Assistant Examiner*—Jennifer H. Malos
*Attorney, Agent, or Firm*—Trapani & Molldrem

[57] ABSTRACT

A transformerless driver circuit for an EL device has a battery or other source of dc power, and a microcontroller that is suitably programmed with associated firmware, so that a first switch control signal appears at a first output and a second switch control signal appears at a second output. A flyback circuit is connected to the first microcontroller output and, through a diode, to a charge storage device, e.g., a capacitor. This charges the capacitor stepwise to a relatively high voltage. The flyback circuit includes an inductor having one end connected to a first terminal of the dc power source, and another end coupled to a transistor or similar switch element. The transistor is coupled to the second dc power terminal, and has a base or gate coupled to the first output of the microcomputer. A controlled discharge arrangement bridges across the charge storage device to discharge the same periodically, and create an alternating current to drive the EL device. A second transistor has its base or gate coupled to the microcontroller second output. An isolating capacitor can be positioned in series between the diode and the charge storage device to eliminate the dc offset to the EL element. In one alternative arrangement, two or more flyback circuits are gated on and off sequentially. In a power-saver arrangement, the discharge circuit returns charge back to the battery.

12 Claims, 4 Drawing Sheets

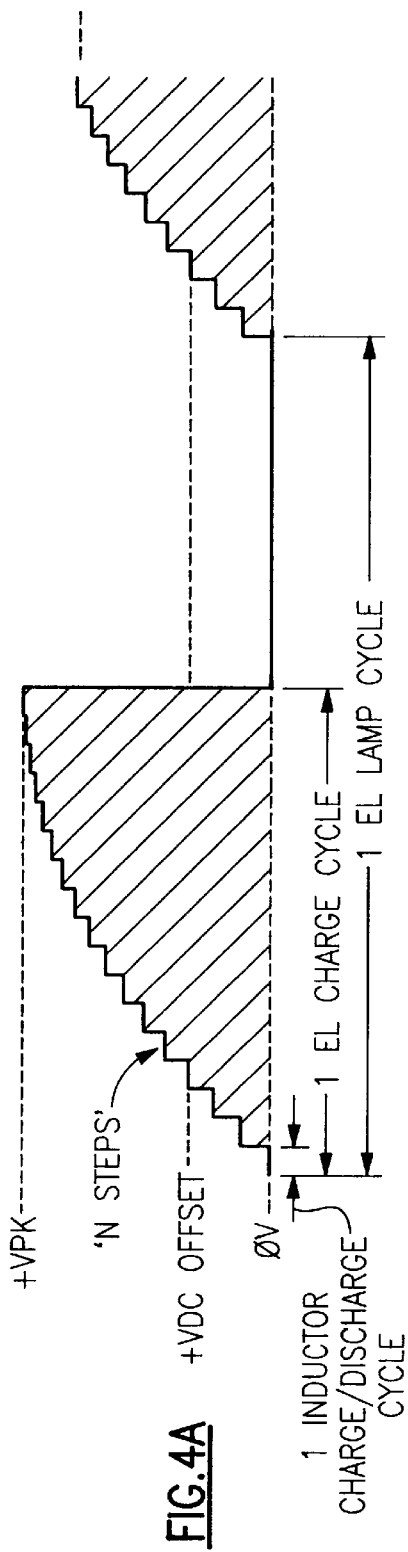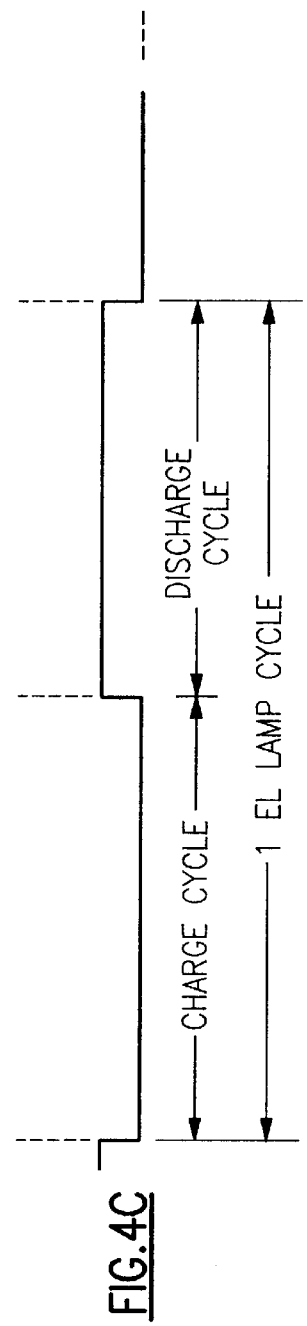

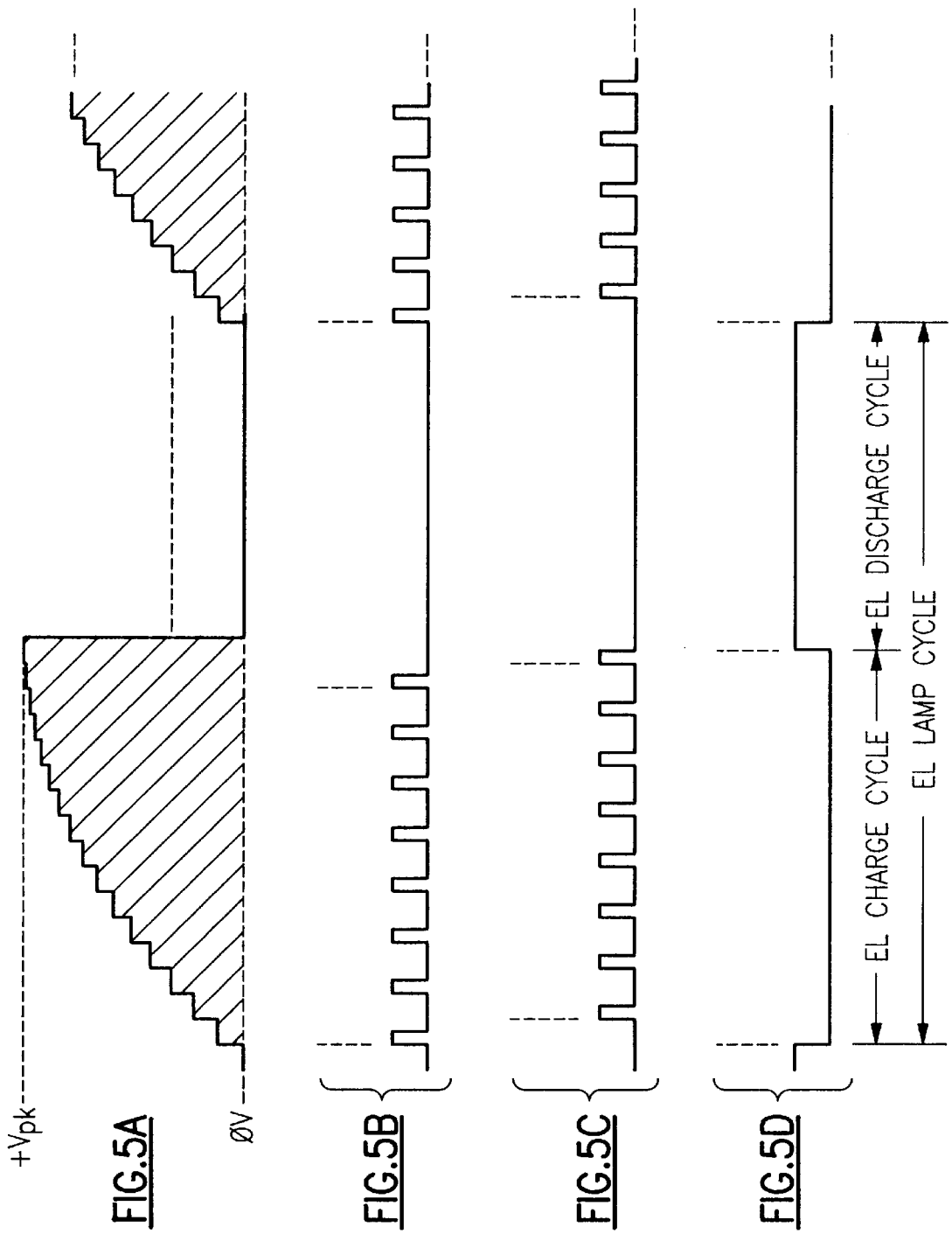

TRANSFORMERLESS ELECTROLUMINESCENT LAMP DRIVER TOPOLOGY

BACKGROUND OF THE INVENTION

The present invention relates to a drive circuit for illuminating an electroluminescent (EL) device, and is more particularly directed to a small, efficient, low-power-drain drive circuit which can be miniaturizable, e.g., to be contained on a small printed circuit board.

The invention is more specifically concerned with a microcontroller actuated transformerless drive circuit, in which inductor coil(s) are switched on and off to charge up a storage element, e.g., capacitor, stepwise to a voltage that is many times higher than the dc supply voltage, and then the storage element is discharged. The charge and discharge cycle produces an ac drive voltage to power the EL device.

This arrangement is suitable for use with EL lamps and panels for illuminating clock faces, for backlighting of liquid crystal displays, or for many other applications which are to be dc battery driven, or for marine, automotive, or aviation use.

Several transformerless, i.e., induction flyback driven circuits, have been proposed. In Fujita U.S. Pat. No. 5,581,160, a pair of self-oscillating signal generators turn charging and discharging circuits on and off. These are free-running oscillators and create flyback pulses even during the discharge cycle. This renders it impossible to control the output levels of the drive circuit. Kimball U.S. Pat. No. 5,483,503 involves a circuit for powering an EL lamp in an electronic watch, which employs a microprocessor and logic circuit to actuate a push-pull driver circuit. Alessio U.S. Pat. No. 5,172,032 shows an EL driver circuit in which separate timer circuits actuate the charging and discharging switch elements. Other inductor-based EL drive circuits are shown in U.S. Pat. Nos. 4,529,322 and 5,502,357.

Nothing in the prior drive circuits employs a microcontroller, programmed with suitable firmware, for producing increasing stepped high voltage charge and discharging to create an optimal ac drive waveform. The prior drive circuits have not employed ganged or multiple-inductor charge stages, actuated alternately or sequentially, to increase the rate of charge of the storage capacitor. Also, prior drive circuits have not employed any sort of energy conservation or recharge means to dump current, on the discharge cycle, back into the battery or other dc power source.

OBJECTS AND SUMMARY OF THE INVENTION

Accordingly, it is an object of this invention to provide a transformerless electroluminescent lamp driver circuit that avoids the drawback of the prior art.

It is another object to provide a transformerless electroluminescent lamp driver topology capable of producing an ac drive wave with wide ranging characteristics.

It is yet another object to provide a circuit topology that increases power through-put and/or permits a decrease in peak input current.

It is a further object to provide a microcontroller based circuit with great flexibility in operation and which can be made as small as possible to minimize circuit board space requirements.

In accordance with an aspect of the present invention, a transformerless driver circuit has a battery or other source of dc power, and a microcontroller that is suitably programmed with associated firmware, so that a first switch control signal appears at a first output and a second switch control signal appears at a second output of the microcontroller. A flyback circuit is connected to the first microcontroller output and, through a diode, to a charge storage device, e.g., a capacitor, for charging the same stepwise to a relatively high voltage. The flyback circuit includes an inductor having one end connected to a first terminal of the dc power source, and another end coupled to a transistor or similar switch element. The transistor is coupled to the second dc power terminal, and has a control element, e.g., base or gate, coupled to the first output of the microcomputer. A controlled discharge arrangement bridges across the charge storage device to discharge the same periodically so that an alternating current appears thereon to drive the EL device. This arrangement can include a second transistor or similar controlled switching element, having a control electrode coupled to the microcontroller second output. An isolating capacitor can be positioned in series between the diode and the charge storage device to eliminate the dc offset to the EL element.

In one alternative arrangement, there are two or more flyback circuits, each with a respective inductor and switching transistor, and each being coupled to a respective output of the microcontroller. The multiple flyback circuits can be driven alternately, i.e., sequentially. In another alternative arrangement, the discharge circuit is configured as a power-saver arrangement, so that the charge that has accumulated in the charge storage device is dumped back to the positive (first) terminal of the battery or other power source.

The code or firmware present in the microcontroller can vary the ac voltage and waveform frequency, so as to achieve a desired level of illumination from the associated EL device.

The above and many other objects, features, and advantages of this invention will become apparent to persons skilled in the art from the ensuing description of a preferred embodiment, which is to be read in conjunction with the accompanying Drawing.

BRIEF DESCRIPTION OF THE DRAWINGS

FIGS. 4A, 4B, and 4C are a waveform charts for explaining the operation of the first embodiment.

FIGS. 5A, 5B, 5C and 5D are waveform charts for explaining the operation of the second embodiment of this invention.

DETAILED DESCRIPTION OF THE PREFERRED EMBODIMENTS

Figure 1:
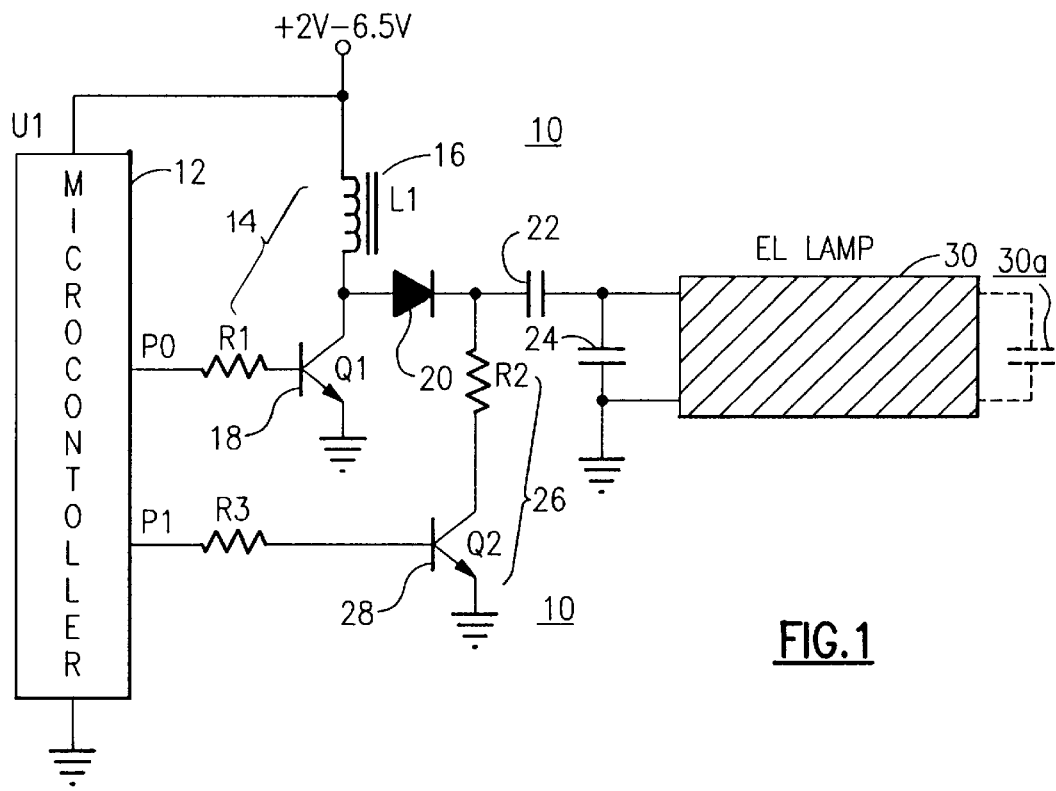
FIG. 1 is a schematic circuit diagram of a transformerless EL driver circuit according to one embodiment of the present invention.

With reference to the Drawing, and initially to FIG. 1, a first embodiment of the EL driver circuit 10 of this invention has a microcontroller 12 whose memory carries a program or microcode as firmware, for generating at its output terminals $P_0$ and $P_1$ suitable charge and discharge control pulses, as described later in respect to FIGS. 4A, 4B, and 4C. A flyback charging circuit 14 is formed of an inductor 16 of value L1 having a first end coupled to a source of dc (i.e., battery) power at a voltage +V, here for example between about +2 volts and +6.5 volts, and a second end coupled to the collector of a switching transistor 18. This transistor has its emitter connected to the other power terminal, i.e., ground, and its base or control electrode coupled, via a resistor R1, to microcontroller output $P_0$. The transistor 18 and inductor 16 define a junction which is coupled by a diode 20 to a charge accumulator, formed of a first capacitor 22 and a second capacitor 24. One plate of the capacitor 24 is grounded. A discharge circuit 26 is connected between the diode end of the capacitor 22 and ground for discharging electrical charge that accumulates on the pair of capacitors 22 and 24. The discharge circuit 26 is formed of a switching transistor 28 whose collector is coupled through a resistor R2 to the capacitor 22, and whose emitter is grounded. The base of the transistor 28 is coupled through a base resistor R3 to the microcontroller output $P_1$.

An electroluminescent lamp 30 is coupled between the two leads of the capacitor 24 and is driven into luminescence by the alternating current produced by the drive circuit 10. In this case a phantom capacitor 30a represents the inherent capacitance of the device 30. In practice, it is possible to omit the discrete capacitor 24, since it is used only for enhancement of storage capacity or for waveform improvement.

Figure 2:
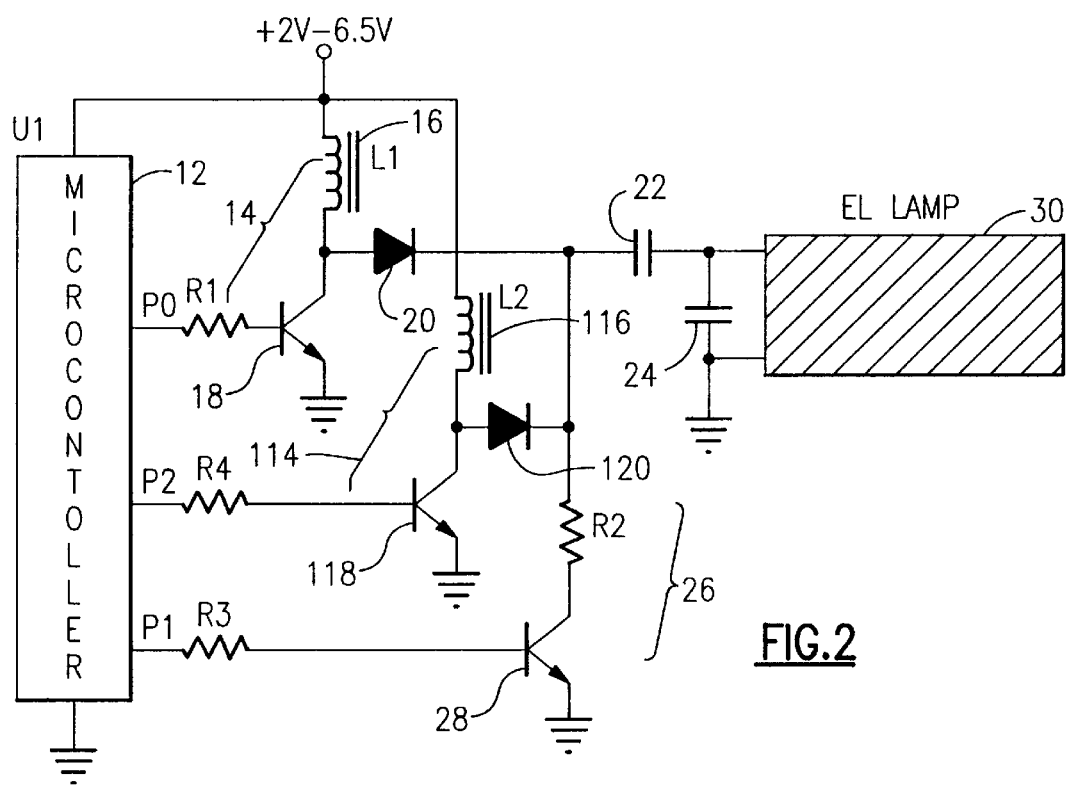
FIG. 2 is a schematic circuit diagram illustrating another preferred embodiment of this invention.

An alternative embodiment is shown in FIG. 2 and the same elements as shown in FIG. 1 are identified with like reference numbers. Here, there is a second flyback circuit 114, formed of switching transistor 118 and a second inductor 116 connected between the positive terminal of the dc supply and the collector of the transistor 116. The emitter of this transistor 116 is grounded, and its base electrode is coupled through a base resistor R4 to an output terminal P2 of the microcontroller 12. A second diode 120 has its anode connected to the junction of the inductor 116 and the collector of the transistor 118, and has its cathode feeding flyback voltage to the capacitors 22 and 24. In this case, the output signals at outputs $P_0$ and $P_2$ can be pulses that appear alternately, so that the two flyback circuits 14 and 114 operate sequentially to charge up the capacitors 22 and 24. This will be described later in respect to FIGS. 5A, 5B, 5C, and 5D. Alternatively, the two flyback circuits can be actuated simultaneously to double the amount of current pulsed into the capacitors for each step.

Figure 3:
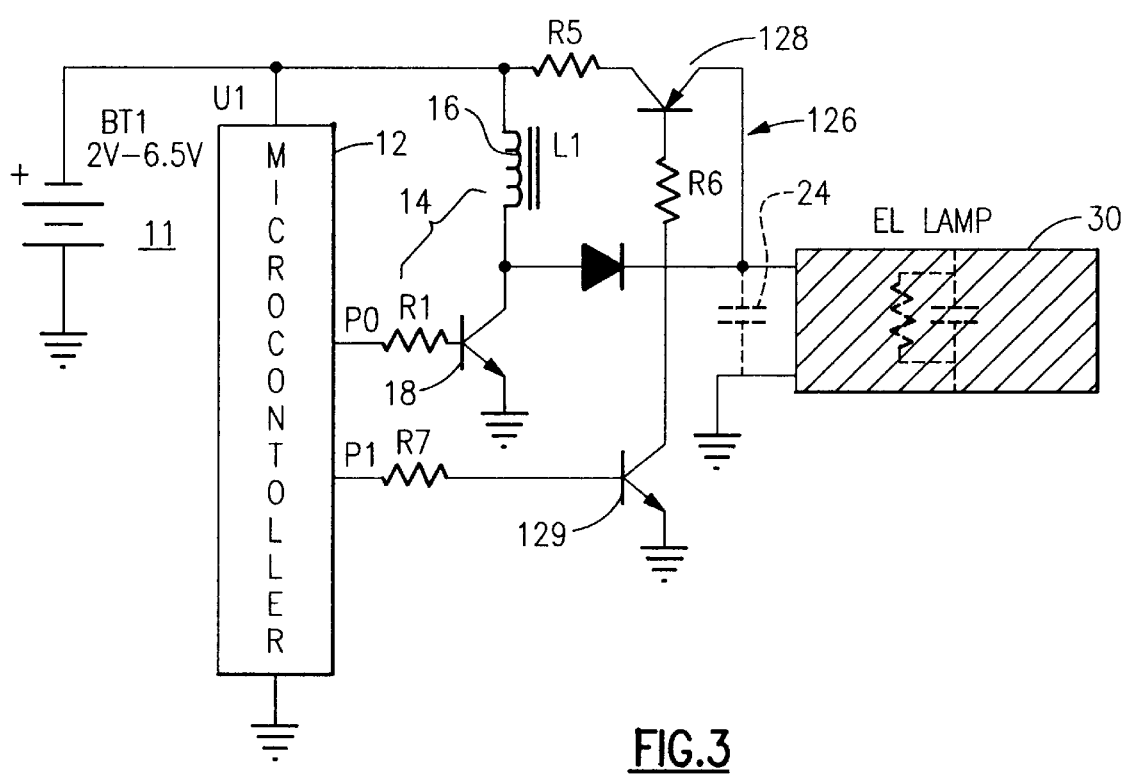
FIG. 3 is a schematic circuit diagram illustrating yet another embodiment of this invention.

A third embodiment of the invention is shown if FIG. 3, which is generally similar to that of FIG. 1. In this view, similar elements to those in FIG. 1 are identified with the same reference numbers, and a detailed description will not be repeated. In this embodiment, the capacitor 22 is omitted, as the latter is optional and serves a DC offset function, described below with reference to FIG. 4A. Also, the storage capacitor 24 is omitted as a discrete element, and its function is achieved by the inherent capacity of the EL device 30.

Here, the discharge circuit 126 is configured as a regenerative or power-saver configuration. That is, in place of the transistor 28 of FIG. 1, there is a PNP switching transistor 128 having its emitter connected to the high end of the capacitor and a collector connected through a resistor R5 to the positive terminal of the power source (here shown as a battery 11). The base of transistor 128 is coupled through a resistor R6 to the collector of an NPN switching transistor 129, whose base is coupled through a resistor R7 to the microcontroller output $P_1$.

The operation of the EL driver circuitry of this invention can be described with reference to FIG. 1 and also to FIGS. 4A, 4B and 4C. The capacitor 24 is charged to a relatively high voltage (over N steps—FIG. 4A) based on the value of the inductance L2 and the time rate of change of current (dI/dt) when the transistor 18 is cut off. The capacitor 24 is charged and discharged over an EL lamp cycle (FIG. 4C), which has a repetition rate on the order of a few hundred Hz to a few KHz. This range is favorably between 200 Hz and 1 KHz, and typically this can be about 800 Hz. The charge portion, i.e., EL charge cycle, as shown, need not be exactly one-half the entire EL lamp cycle. During the EL charge cycle, the charge circuit 14 is cycled N times, and at each charge cycle, here shown as inductor charge/discharge cycle, flyback voltage is pumped from the inductor 16 through the diode 20 to the capacitor(s) 22, 24.

In this embodiment, during the EL charge cycle, switching pulses (FIG. 4B) appear at the output $P_0$ of the microcontroller 12, and these cut the transistor 18 on and hard off. This causes the current to pulse N times through the inductor 16, generating the relatively high flyback voltage that charges up the capacitor 24. During the EL discharge cycle, when the output $P_1$ is low, the pulses do not appear at the output $P_0$. The value L1 of the inductor 16, the capacitance of the capacitor 24, and the current requirement of the EL device 30 will determine the number of charging steps N and the duty cycle of the output pulses at outputs $P_0$ and $P_1$. Favorably, the pulses at output $P_0$ can have a rate of between 10 times and 40 times the pulse rate of the pulses at the output $P_1$, and preferably about 20 times that pulse rate.

As mentioned above, the capacitor 22 is an optional circuit element. In the absence of this element, the EL lamp device 30 charges up to a positive peak voltage, and then returns to ground potential at the discharge portion of the EL lamp cycle. When the capacitor 22 is present, it serves to block the dc portion (i.e., voltage $V_{dcoffset}$—FIG. 4A) of the ac voltage appearing across the device 30. The value of the capacitor 22 is chosen to be approximately twenty times the capacitance value of the EL lamp 30 (or, as a rule of thumb, about twenty times the combined capacitance of the lamp 30 and the capacitor 24 plus any coupling capacitance). This means that the commensurate reactance of the capacitor 22 is only about one-twentieth that of the EL lamp 30, so there is only an insignificant voltage loss across the capacitor 22. However, with the capacitor 22 in circuit, the relative polarity that the EL lamp device 30 sees will alternate with each half cycle. That is, the capacitor ac-couples the drive circuit to the lamp device 30. This provides the benefit of reducing the effective peak value of the voltage impressed across the EL lamp, by allowing it to center itself about a zero dc offset. The duty cycle of the signal at output $P_1$ is then selected to achieve a symmetrical EL lamp drive signal. An optional resistor R6, in series with transistor 128, is for peak discharge current control.

In the embodiments having two or more flyback circuits, e.g., FIG. 2, the operation is basically the same as that of FIG. 1, except that two, or more, flyback circuits can be gated on and off using time-phased pulse trains, as shown in FIGS. 5B and 5C. The pulse signals appearing at outputs $P_0$ and $P_2$ gate the transistors 16, 116, etc., sequentially. In this embodiment, this permits twice as many charge steps in each EL lamp cycle (FIG. 5D), i.e., a multiple depending on the number of flyback circuits. Alternatively, all the flyback circuits can be pulsed on together, to increase the flyback current for each of the N steps.

All of the above-described circuits can be implemented using appropriate power MOSFETs to reduce the component count and to enhance circuit performance. Also, as the system is completely under firmware control, additional features can be implemented, such as external synchronization, multiple brightness levels, programmed on-time, flash mode ambient light sensing, sleep mode, etc. The circuit as described could also be arranged for negative battery operation, substituting PNP for NPN transistors and reversing the diode polarities. The various transistors could also be integrated, rather than discrete devices.

While the invention has been described in detail with respect to one preferred embodiment, it should be recognized that there are many alternative embodiments that would become apparent to persons of skill in the art. Many modifications and variations are possible which would not depart from the scope and spirit of this invention, as defined in the appended claims.

I claim:

1. A transformerless driver circuit for creating a high voltage ac waveform suitable for powering an electroluminescent lamp device, comprising:

a source of dc power having a first and second terminals;

a microcontroller suitably programmed with associated firmware to output first and second signals at first and second microcontroller outputs, respectively;

a flyback circuit including an inductor having one end coupled to the first terminal of said dc source, and another end; a first controlled switching element coupled between the other end of said inductor and said second terminal of said dc source, and defining a junction between the first switching element and said inductor, and having a control electrode coupled directly to the first microcontroller output to receive said first signal from said first microcontroller output; and a diode having a first electrode coupled to said junction and a second electrode;

a charge storage retention means coupled to the second electrode of said diode to accumulate flyback voltage from said flyback circuit; and a controlled discharge arrangement coupled across said charge storage retention means including a second controlled switching element having a control electrode coupled directly to said second microcontroller output to receive the second signal from the second microcontroller output.

2. The transformerless driver circuit of claim 1 wherein said first switching device comprises a switching transistor connected in series with said inductor.

3. The transformerless driver circuit of claim 1 wherein said charge storage retention means includes a discrete capacitor.

4. The transformerless driver circuit of claim 3 wherein an isolating capacitor is situated in series between the second electrode of said diode and said discrete capacitor.

5. The transformerless driver circuit of claim 1 wherein said first and second signals are pulse signals, and said first pulse signal is at a frequency in a range of ten to forty times the pulse frequency of said second signal.

6. The transformerless driver circuit of claim 5 wherein said first pulse signal is at a frequency of at least about twenty times the pulse frequency of said second signal.

7. The transformerless driver circuit of claim 1 wherein second pulse signal is on the order of 200 Hz to 1 KHz.

8. The transformerless driver circuit of claim 1 wherein said first signal is present as a pulse train when said second signal has one state, and is absent when said second signal has a second state.

9. A transformerless driver circuit for creating a high voltage ac waveform suitable for powering an electroluminescent lamp device, comprising:

a source of dc power having a first and second terminals;

a microcontroller suitably programmed with associated firmware to output a plurality of first signals at respective first microcontroller outputs and second signals at a second microcontroller output, respectively;

a plurality of flyback circuits, each including an inductor having one end coupled to the first terminal of said dc source, and another end; a respective controlled switching element coupled between the other end of the inductor and the second terminal of said dc source, and defining a respective junction between the switching element and the inductor, and having a control electrode coupled to receive a respective one of said first signals from said first microcontroller outputs; and a respective diode having a first electrode coupled to said junction and a second electrode;

a charge storage retention means coupled to the second electrodes of said diodes to accumulate flyback voltage from said flyback circuits; and a discharge arrangement coupled across said charge storage retention means including a second controlled switching element having a control electrode coupled to receive the second signal from the second microcontroller output;

wherein said plurality of first signals are in the form of time-phased interleaved pulse trains, so that said flyback circuits are gated on and off alternately, and said respective flyback circuits act in sequence to charge said charge storage retention means.

10. The transformerless driver circuit of claim 9 wherein said first signals are applied directly from the first microcontroller terminals to the control electrodes of said respective controlled switching elements in time sequence.

11. A transformerless driver circuit for creating a high voltage ac waveform suitable for powering an electroluminescent lamp device, comprising:

a source of dc power having a first and second terminals;

a microcontroller suitably programmed with associated firmware to output first and second signals at first and second microcontroller outputs, respectively;

a flyback circuit including an inductor having one end coupled to the first terminal of said dc source, and another end; a first controlled switching element coupled between the other end of said inductor and said second terminal of said dc source, and defining a junction between the first switching element and said inductor, and having a control electrode coupled to receive said first signal from said first microcontroller output; and a diode having a first electrode coupled to said junction and a second electrode;

a charge storage retention means coupled to the second electrode of said diode to accumulate flyback voltage from said flyback circuit; and a power-saver discharge arrangement coupled between said charge storage retention means and the first terminal of said dc power source for discharging accumulated electric charge from said storage retention means into said power source, and including a switching element coupled between said charge storage retention means and said first terminal, and gating means coupled to the second microcontroller output for gating said switching element on and off.

12. The transformerless driver circuit of claim 11, wherein said gating means includes a transistor having a control electrode coupled to the second output of said microcontroller and an output electrode coupled to a gating electrode of said switching element.

* * * * *